United States Patent [19]
Lanteri

[11] 3,931,273
[45] Jan. 6, 1976

[54] METHOD FOR SULPHONATIZING AND SULPHATIZING ORGANIC COMPOUNDS WITH SULPHUR TRIOXIDE AND APPARATUS THEREFOR

[75] Inventor: Agostino Lanteri, Busto Arsizio, Varese, Italy

[73] Assignee: Costruzioni Meccaniche G. Mazzoni S.p.A., Busto Arsizio, Varese, Italy

[22] Filed: Mar. 14, 1974

[21] Appl. No.: 451,200

Related U.S. Application Data

[63] Continuation of Ser. No. 114,973, Feb. 12, 1971, abandoned.

[30] Foreign Application Priority Data

Feb. 23, 1970    Italy............................20991/70

[52] U.S. Cl.......... 260/458; 260/459 R; 260/513 T; 260/505 R; 23/284
[51] Int. Cl².............. C07C 141/02; C07C 143/16; C07C 143/12: C07C 143/34
[58] Field of Search.... 260/458, 459, 513 R, 505 R, 260/505 C, 457, 458 R, 458 C, 459 R, 513 T; 23/277 R, 284

[56] References Cited
UNITED STATES PATENTS

| | | | |
|---|---|---|---|
| 2,923,728 | 11/1957 | Falk et al. | 260/458 |
| 3,169,142 | 2/1965 | Knaggs et al. | 260/458 |
| 3,270,038 | 8/1966 | Marshall | 260/458 |
| 3,531,518 | 7/1966 | Ohren et al. | 260/5.3 R |

Primary Examiner—James O. Thomas, Jr.
Assistant Examiner—Nicky Chan
Attorney, Agent, or Firm—Young & Thompson

[57] ABSTRACT

A continuous method for sulphonating and sulphating liquid organic compounds with gaseous sulphur trioxide diluted with inert gas in a plurality of externally cooled, parallel reaction tubes with downward flow communicating at the injection nozzles of the liquid and gas reactants with a single chamber under uniform pressure, from which an additional inert gas flows into the several reaction tubes so as to equalize the pressures downstream of all of said injection nozzles in order to provide for a uniform distribution of the reactants to said reaction tubes, as seen in FIGS. 1–5.

This method is applied to all the organic compounds susceptible to said reactions.

7 Claims, 5 Drawing Figures

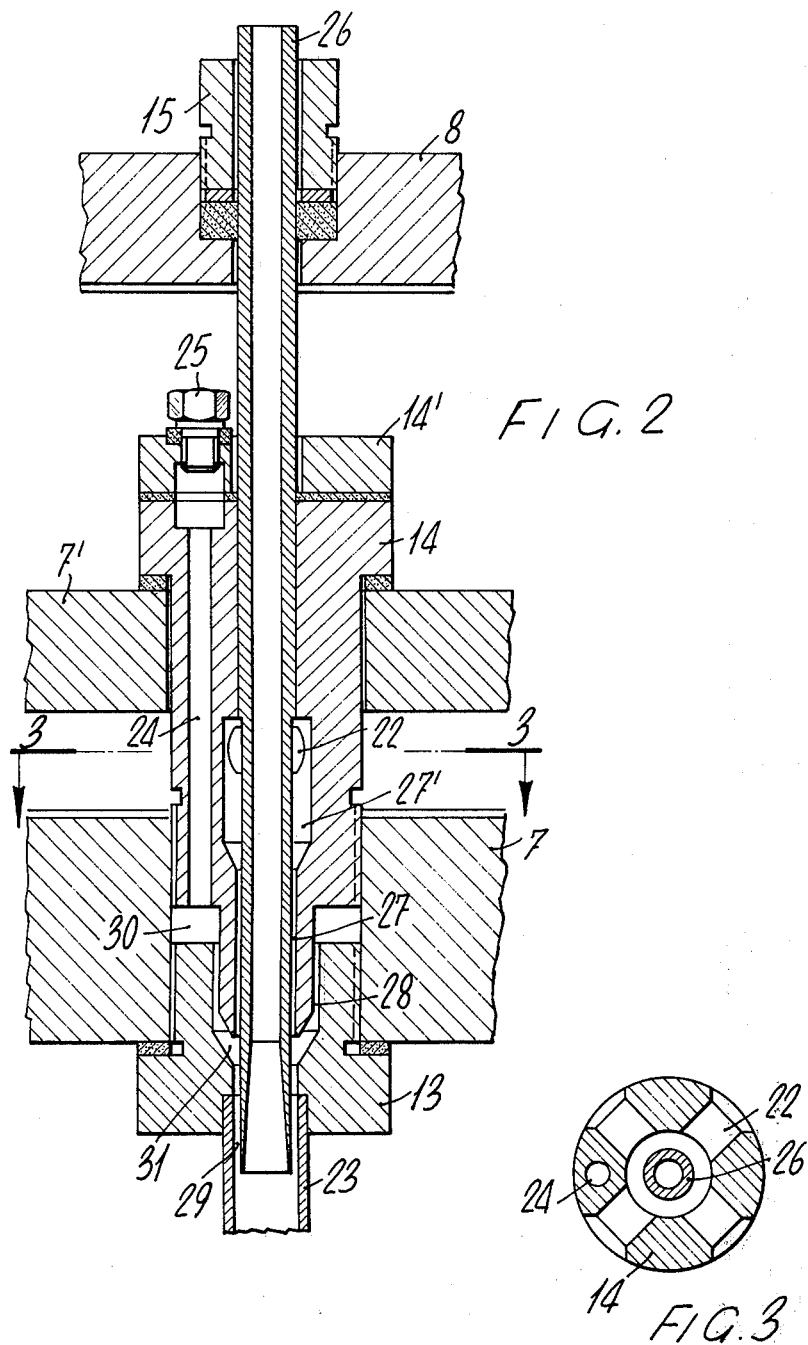

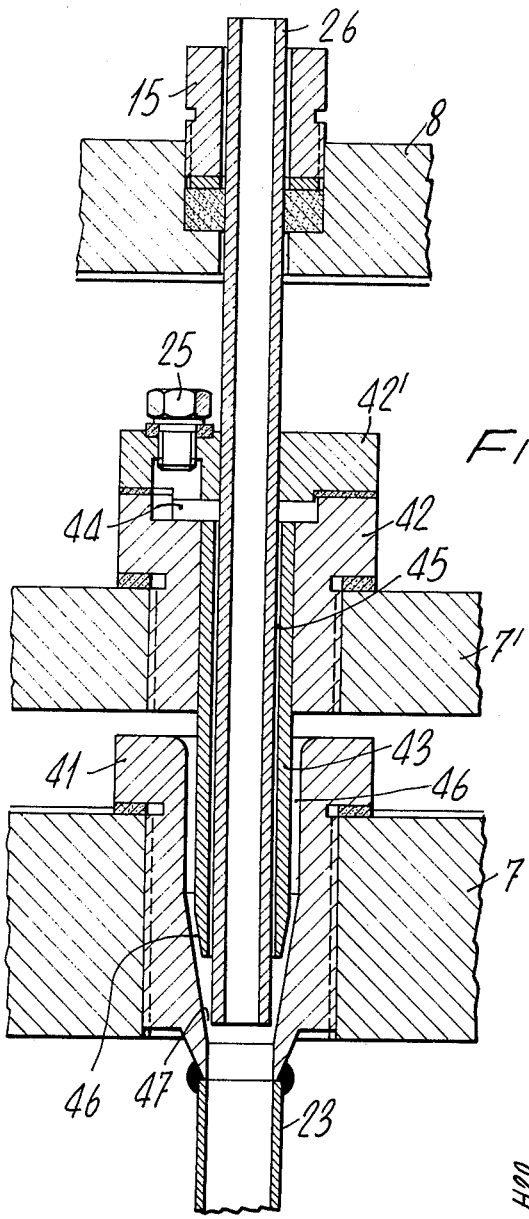
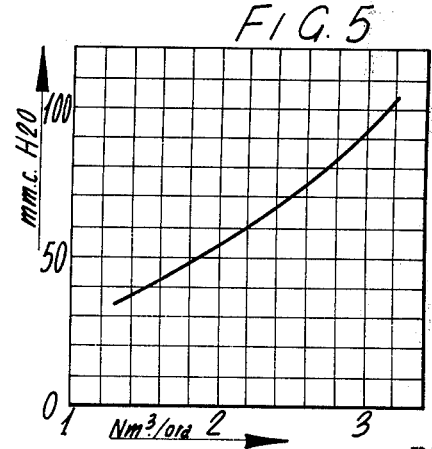

METHOD FOR SULPHONATIZING AND SULPHATIZING ORGANIC COMPOUNDS WITH SULPHUR TRIOXIDE AND APPARATUS THEREFOR

This is a continuation of application Ser. No. 114,973, filed Feb. 12, 1971, now abandoned.

This invention relates to a continuous method for sulphonating and sulphating liquid organic compounds with sulphur trioxide gas. As used herein, the term "liquid" means that the organic compounds to be processed are liquid at room temperature or at the temperature at which they are reacted with sulphur trioxide.

More particularly, this invention relates to a method and an apparatus for reacting organic compounds with gas containing sulphur trioxide in a two-phase gas-liquid flow system consisting of parallel conduits. The method is applicable to all of the organic compounds capable of reacting with diluted sulphur trioxide, either forming sulphonates or sulphates.

Methods are known for carrying out gas/liquid reactions in two-phase cocurrent flow systems, wherein the required turbulence for causing the interphase contact and heat transfer is essentially achieved at the charge of the gas stream energy. To this end, elongated reaction zones are generally used in the form of conduits or tubes where the gas and liquid reactants are continuously introduced from the same end. For example, U.S. Pat. No. 2,528,320 describes such reaction techniques for paraffin sulphochlorination with a gaseous mixture of gas sulphur trioxide and chlorine, characterized in that the superficial gas velocity is kept at a sufficiently high rate to cause an annular turbulent flow. This type of flow is characterized in that the liquid is caused by the gas velocity to circumferentially flow on the inner tube walls, as in the central portion the gas flows around the tube axis. U.S. Pat. No. 2,865,958 describes a sulphonatizing method, according to which a mineral oil containing olefine hydrocarbons and/or aromatic hydrocarbons and gas containing sulphur trioxide are introduced from an end into a tubular chamber. The organic liquid circumferentially enters the chamber and is dispersed in the gas jet centrally penetrating therein.

In most cases, such as in producing organic sulphonates and sulphates for detergents and similar uses, the reaction of the organic compounds with sulphur trioxide is extremely rapid and exothermic. Moreover, several products being obtained in this reaction, particularly organic sulphuric esters, are unstable. Suitable means have to be used for ensuring an even contact of the reactants, a rapid removal of the reaction heat and a short residence time of the product in the reaction zone. Otherwise, charrings and other undesirable effects would occur, which could adversely affect the quality of the final product. In these circumstances, an annular turbulent flow is definetely useful, as enabling an even interphase contact and an efficient temperature control by circulating cooling liquid outside the walls encircling the reaction zone.

According to U.S. Pat. No. 2,923,728, an annular turbulent flow for the liquid organic compound is established on the inner walls of a tube by propelling by an inert gas, as a mixture of sulphur trioxide and another inert diluent gas is introduced into the central zone of the tube. This method is suitable for small scale productions. A laboratory apparatus based on this principle is described in Soap & Chemical Specialities, May 1967, page 67. It includes a downward vertical flow reaction tube having an inner diameter of 5 mm.

An increase in flow rate would involve an increase in the tube diameter and length and, at the same time, an increase in flow velocity. However, there are limits to this purpose because the gas supply pressure may become undue and/or the product quality may be lowered. Good reaction conditions are achieved by tubes of a comparatively small diameter or conduits in the form of rectangular or annular slot with a reduced thickness.

Industrial reactors generally include a single reaction zone in the form of an annular conduit between two concentric cylindrical surfaces, having a free cross-section suitable to the intended flow rate, or a plurality of parallel reaction zones in the form of circular tubes. These are downward flow vertical systems, wherein an annular type of flow is naturally established in a wide range of gas velocities. However, it is important to maintain an essentially high velocity for the gas phase in order to provide the liquid phase with velocity and turbulence, thereby ensuring an even reaction, an efficient temperature control and a short residence time of the product in the reaction zone.

In these reactors the problem arises for evenly distributing the liquid and gas reactants throughout the single reaction zone or in all of the parallel reaction zones. In this connection, known methods have several disadvantages.

In the case of annular conduit reactors (see British Patent No. 1,029,029), a uniform free cross section is required throughout the reaction zone. This gives rise to highly strict accuracy problems in construction, particularly where large reactors for important industrial productions are concerned. British Patent No. 1,103,441 describes a reactor in the form of an annular conduit provided with a cage stirring member rotating in the initial portion of the reaction zone in order to ensure an even distribution and contact for the reactants. However, this approach requires the use of a mechanical stirrer which has to rotate at a high speed closely adjacent the two surfaces.

Particularly, in those reactors where liquid and gas would flow in completely separate parallel conduits, such as the tubular reactors this invention is related to, an even distribution of the liquid and gas reactants is hampered by the changes which may occur in flow resistance of the several elements. These changes may depend on changes in the inner diameter within the ranges of commercial tolerances or the roughness of the inner surfaces. A certain change (in absolute length rate) in the inner diameter would cause a percentage change in pressure drop which is the higher as smaller is the tube diameter. Accordingly, while the reaction conditions improve as the inner diameter of the tubes decreases, the conditions for evenly distributing the reactants become more unfavourable. These changes may be enhanced in the long run because of unevenesses in corrosion and erosion. In addition to this, it occurs in two liquid/gas phase flows that an increase in liquid flow rate or in liquid viscosity would cause an increase in the resistance to gas flow. Accordingly, it may occur that in a reaction tube, where the liquid flow rate has an excess error (due to the metering element), there would be a shortage of gas flow rate, whereby in the reactant ratio there will be an overall error which is the sum of the two errors. The same may occur in a tube where the liquid flow rate shows an error in shortage. Finally, there may be slightly different reaction conditions from one tube to another, which may result in changes in pressure drop of the gas flow.

U.S. Pat. No. 3,169,142 describes a reactor formed of tubes having an inner diameter of about 11 mm., in which the distribution of the liquid reactant to the various tubes is effected by means of nozzles capable of building up a high pressure drop in order to minimize the effect of possible changes in the pressure downstream the nozzles on the liquid flow rate. Similarly, the distribution of the gas reactant is effected by means of nozzles capable of building up a high pressure drop relative to that in the reaction tubes. Thus, possible changes in the tube resistance would scarcely affect the gas flow rate of each element, since the latter depends on the overall pressure drop of the nozzle and tube. In this system the drawback is in that most of the gas stream energy has to be dissipated in the distributing nozzles and only a comparatively small portion is available for flow in the reaction tubes. Therefore, the gas velocity or flow rate in the reaction tubes has to be limited: substantially it is in the order of 15 m/sec., referred to the tube section. As a result of this, the gas and liquid flow rate per tube is rather low. An increase in the liquid flow rate, without a corresponding increase in the gas flow rate, can be provided within determined limits by increasing the sulphur trioxide concentration in the gas, but this is normally prejudicial to the quality and particularly to the colour of the product. Additionally, in most cases it is considerably advantageous to operate with a substantially higher gas velocity or rate, preferably in the range of 35–65 m/sec. in order to provide the liquid phase in the action tubes with turbulence and velocity. Under these conditions a rapid and even reaction occurs in all of the liquid portions with a short stay time and minimum alteration of the product. However, this requires some consumption of the gas stream energy, particularly in the case of sulphonation and sulphation products having a substantial viscosity at reaction temperature. To provide for this energy, it is necessary that a sufficient pressure drop be available in said tubes.

The method of the present invention enables to provide a substantially even distribution of the liquid and gas reactants to a plurality of parallel reaction tubes independently within sufficiently wide ranges of the changes in flow resistance which may occur in the several tubes, without any need for this to restrict the pressure drop in said tubes. To this end, the present method provides a substantial pressure equalization in all of the parallel reaction tubes immediately downstream of the distributing nozzles for the liquid and gas reactants.

Accordingly, this invention relates to a method for sulphonating and sulphating liquid organic compounds by diluted gas sulphur trioxide with inert gas in a plurality of externally cooled, parallel reaction tubes with downward flow, characterized in that the reaction tubes at the injection nozzles for the liquid and gas reactants communicates with a single uniform pressure chamber, additional inert gas freely flowing therefrom to the several reaction tubes, so as to substantially equalize the pressures downstream of all of the injection nozzles for the liquid and gas reactants. This additional inert gas is hereinafter referred to as equalizing gas. As a principle, the equalizing gas freely flows to the reaction tubes when the inlet pressure drops are negligible in relation to the pressure drops in the injection nozzles for the gas reactant. In most cases of practical application for the present method, a sufficiently even distribution of the reactants is provided when the inlet pressure drops of the equalizing gas are some units percent at the most of the pressure drop in the injection nozzles for the gas reactant. Under these conditions, the equalizing gas will be distributed to the reaction tubes, so that the overall gas flow rate of each tube is a decreasing function of the resistance thereof against the gas flow. It is apparent from the foregoing that the substantial pressure equalization downstream of the distributing nozzles for the liquid and gas reactants is depending on a substantial equalization of pressure drops in all of the reaction tubes. Generally, the amount of equalizing gas would vary approximately in the range of 8–19 percent of the total amount of inert gas flowing in each tube. Generally, the inert equalizing gas is air. The equalizing gas may be introduced into the reaction tubes concentrically between the liquid reactant supplied to the inner surfaces of the tubes and the gas reactant injected into the central zone of each tube, or may be introduced together with the liquid reactant through convergent-shaped inlets of the reaction tubes and encircling the injection nozzles for the gas reactant.

For a more detailed description of the characteristics of the present method, reference is made to the accompanying drawings, in which:

FIG. 1 is a diagrammatic vertical sectional view showing a reactor for carrying out the method according to the invention (in this figure, $A_1$ indicates $SO_3$+ inert diluent gas; $B_1$ a liquid organic reactant; C an equalizing inert gas; D a vent; E the cooling water outlet; and F the cooling water inlet);

FIG. 2 is a detailed view showing the device for introducing the reactants and equalizing gas into the reaction tubes according to FIG. 1;

FIG. 3 is a horizontal sectional view showing the device in FIG. 2 at the inlet apertures for the equalizing gas;

FIG. 4 is a view showing another form for introducing the reactants and equalizing gas into the reaction tubes for use in the method according to the present invention; and FIG. 5 is a diagram showing the inlet pressure drops for the equalizing air in a device as shown in FIG. 2.

Figure 1:
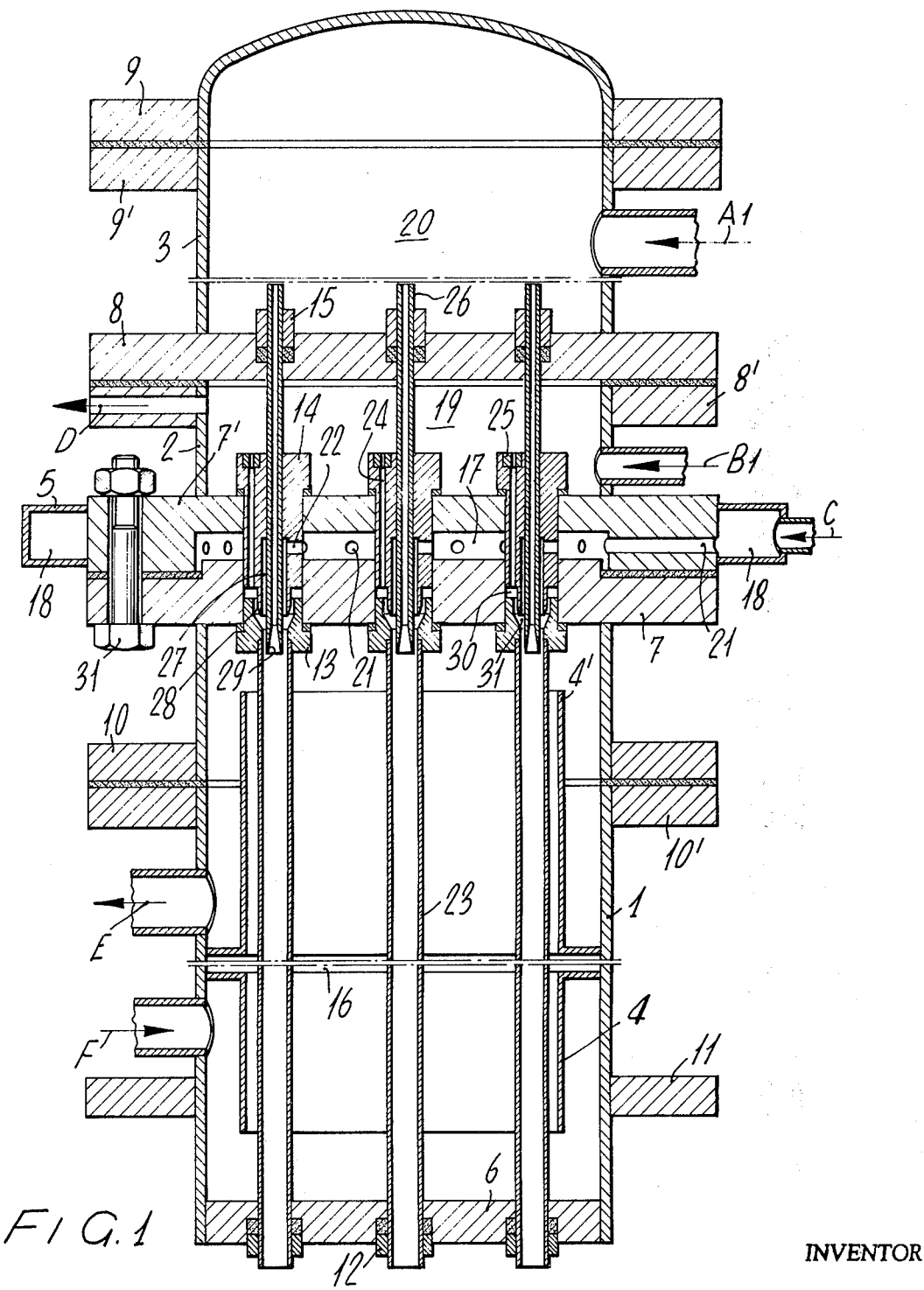

As shown in FIG. 1, the reactor is formed of a preferably vertical cylindrical housing or shell 1 enclosing a plurality of reaction tubes 23 (for simplicity, three only of such tubes being shown in the figure, but the reactor can comprise up to more than one hundred tubes). At the lower end thereof the tubes are secured to the plate 6 by means of sealing elements 12, while being welded at the upper end thereof to threaded connectors 13; these are sealingly clamped (by suitable seals) in the lower portion of threaded holes in the flanged plate 7. The housing or shell 1, plates 6 and 7 and walls of tubes 23 enclose the chamber 16, in which cooling water can be circulated from end to end by baffles 4 and 4'. For an efficient cooling, in chamber 16 there are also provided transverse baffles or other known devices (not shown in the drawing). The inner diameter of tubes 23 can be within about 8–18 mm. However, an internal diameter of 8–13 mm. is generally preferable to provide a sufficient flow rate per tube and an acceptable quality of product. In order to obtain the desired reaction degree, the tube length should increase as the inner diameter increases. Generally, the tube length is 0.8–5.0 meters and preferably 1.0–3.5 meters. A flanged plate 7' is fixedly mounted on flanged plate 7 and has lying exactly above holes at the threaded holes in flanged plate 7, the connectors 14 passing therethrough and being clamped at the upper portion of the threaded holes in plate 7 so as to seal (by suitable seals) on the flanged plate 7'. The connectors 14 carry the elements for introducing the reactants and gas into the reaction tubes. A chamber 17 is provided between the flanged plates 7 and 7' and communicates with the annular chamber 18 formed by the housing or shell 5 which is welded outside the flanged plate 7'. The annular chamber 18 communicates with chamber 17 by means of radial holes 21 in the protruded portion on the flange of plate 7. By means of this connection, some inert gas can be supplied to chamber 17 and distributed therefrom as equalizing gas, as described below. A chamber 19 is located over the flanged plate 7' and defined at the top by the separating flanges plate 8 and laterally by the cylindrical housing or shell 2, the liquid organic reactant being supplied from this chamber 19 to the reaction tubes by means of the distributing nozzles 25 mounted on the connectors 14. The top portion of the reactor between the separating flanged plate 8 and the flange cover or lid 9 and laterally defined by the cylindrical shell or housing 3 comprises the chamber 20, from which the gas reactant is supplied to the reaction tubes by means of the distributing nozzles 26 centrally secured to the connectors 14 and passing through the separating flanged plate 8; the latter is provided with holes at the threaded holes in the flanged plate 7', fitted with sealing elements 15. The flange 11 is for connecting the reactor to the outlet conduit.

The elements for introducing the reactants and equalizing gas into the reactor in FIG. 1 are shown in greater detail in FIGS. 2 and 3. As metered by means of nozzle 25, the liquid organic reactant moves down the conduit 24 to the space 30 between the connectors 13 and 14 in the threaded hole in plate 7; by means of the annular aperture 28 between the inner cylindrical surface of connector 13 and the outer cylindrical extension surface of connector 14 and the conical connector 31, the liquid is distributed therefrom on the periphery externally defining the annular aperture 29 opening into the reaction tube 23. The gas reactant is metered by means of nozzle 26 and concentrically injected into the innermost portion of reaction tube 23. Preferably, the outlet mouth of nozzles 26 is flared by a cone angle of about 7°. The equalizing gas enters the radial holes 22 of connector 14, travels along the annular conduit 27 between the inner cylindrical surface of the final section of connector 14 and the outer surface of nozzle 26 and penetrates the reaction tube 23 concentrically between the liquid reactant and the gas reactant jet. The annular apertures 28 are of a rather narrow thickness to cause the liquid to be distributed on the whole periphery, but such however to exhibit only a minimal flow resistance. Generally, this port is between 0.5 and 1.2 mm. Preferably, the thickness for the annular apertures 29 is in the range of 1.0–1.8 mm and the length thereof is in the range of 5–30 mm.

FIG. 4 shows a further convenient arrangement for introducing the reactants and equalizing gas into the reaction tubes. Plates 7 and 7' are provided with threaded holes which are identical and properly overlying for receiving the connectors 41 and 42. An end portion of connectors 41 are convergent by a cone angle of about 22°. Connectors 42 have a tubular extension 43 enclosing the gas nozzle 26 and forming an annular passage 45, through which the liquid organic reactant downward moves to the apertures 47 between the end conical surface of connector 41 and the outer rim of nozzle 26. The equalizing gas gets to this aperture passing through the annular conduit 46 between the inner surfaces of connector 41 and the outer surfaces of the tubular extension 43. Through said aperture 47, the liquid organic reactant and equalizing gas are concurrently introduced into the reaction tube 23 externally of the gas jet emerging from the nozzle 26. Good results are obtained when the outer diameter of nozzles 26 is substantially the same as the inner diameter of the reaction tubes 23 and the end of nozzle 26 is recessed by 2.0–3.5 mm from the converging end of connector 41, whereby the thickness of aperture 47 is the range of about 0.4–0.7 mm. The arrangement in FIG. 4 is particularly suitable for reaction tubes having an inner diameter of 6–10 mm. In these cases, also the arrangement in FIG. 2 can be used, however requiring the use of gas reactant injection nozzles having a small diameter to provide a suitable thickness for the annular apertures 29. However, the arrangement in FIG. 4 can be used also with reaction tubes of a larger diameter and affording, for example, substantially the same results as those obtained by the arrangement in FIG. 2 in the case of reaction tubes having an inner diameter of 13 mm.

The equalizing gas in chamber 17 flows from periphery to center while being distributed to the reaction tubes 23 through holes 22 and annular conduits 27 (FIG. 2) or annular conduits 46 (FIG. 4). The pressure differential building up between the periphery and center of chamber 17 because of the gas flow will vary depending on the diameter of the chamber or the number of reaction tubes and the equalizing gas flow rate, however being always quite negligible and in the order of 1 mm. water column, or less.

The inlet pressure drop of the equalizing gas in reaction tubes 23 is mostly localized at apertures 29 (FIG. 2) or 47 (FIG. 4), where the gas flows together with the liquid organic reactant. The thickness for apertures 29 or 47 will depend on the liquid organic reactant flow rate related to the inner perimeter unit for tubes 23 and minimal and maximal equalizing gas flow rates. At the minimal flow rate, the inlet velocity of the equalizing gas should be sufficient to prevent the gas jet emerging from nozzles 26 from diffusing into the apertures 29 or 47. Such a diffusion may cause a premature reaction of the organic compound with sulphur trioxide and colour development. On the other hand, the inlet pressure drops, within the flow rate range required for equalizing the changes in resistance of tubes 23, should be at a maximum some units percent of the pressure drop provided by the gas reactant nozzles 26. In the above shown apertures, the inlet pressure drops are generally within 20–120 mm water column for equalizing gas flow rates in the range of 8–19 percent of the total inert gas flow rate per tube. In order to set up the above ratio of pressure drops the nozzles 26 are dimensioned in connection with the gas reactant flow rate, so as to set up a pressure drop generally in the range of 0.10–0.35 $kg/cm^2$.

The highest difference in pressure downstream of the gas reactant distribution nozzles is given by the difference in inlet pressure drops for the equalizing gas corresponding to the maximal and minimal flow rates. This difference is related to the maximal difference in resistances of the parallel reaction tubes. The maximal percentage difference in gas reactant distribution to the reaction tubes is as from the following relation:

$$\left( \sqrt{\frac{\Delta P}{\Delta P \Delta (\Delta_p \max - \Delta_p \min)}} - 1 \right) \times 100$$

wherein $\Delta P$ is the pressure drop at the gas reactant nozzles, while $\Delta_p$ max and $\Delta_p$ min are the inlet pressure drops for the equalizing gas corresponding to the maximal flow rate and minimal flow rate, respectively. Similarly, the maximum difference in liquid reactant distribution can be estimated. Since the pressure drops caused by gas flows in holes 22 and conduits 27 (FIG. 2) or conduits 26 (FIG. 4) are about 30 percent or less of the total inlet pressure drop for the equalizing gas, the pressure differential downstream of the liquid distribution nozzles is minimal. Accordingly, nozzles can be used having a pressure drop which is comparatively low when related to the required liquid flow rate. This is desirable in order to avoid a too high velocity for the liquid, which may cause erosion on the inner surfaces of the precision gauged holes.

The pressure drop in the reaction tubes 23 may be also substantially higher than that in nozzles 26. Therefore, the restrictions in the prior art can be overcome as to the liquid flow rate and gas speed in the reaction tubes.

The superficial gas velocity in the reaction tubes resulting from the overall inert gas flow rate, e.g. $SO_3$ diluting gas and equalizing gas, is generally in the range of 20-80 m/sec., preferably 35-65 m/sec. At lower velocity than the minimal level indicated, the interphase contact may be unsatisfactory, or the liquid phase may be overheld in the reaction zone. Within the above shown velocity range, an interphase mixing occurs which increases as the gas velocity increases; the interphase surface is complex and liquid portions would leave the continuous phase for entering the gas phase and then re-entering the continuous liquid phase. For velocities exceeding the maximal level indicated, liquid portions would tend to be gradually and more firmly suspended in the gas phase as minute droplets which may unduly react with sulphur trioxide or be drawn by the outlet exhausted gas.

The concentration of sulphur trioxide in the gas, as the latter becomes diluted with the inert gas for equalizing the pressures and contacts the liquid organic reactant, is generally in the range of 2-12 percent by volume, preferably 3-6 percent by volume. The molar ratio of sulphur trioxide and organic compound will vary according to the nature of the latter and is in the range of 0.9-1.2, more generally 0.95-1.15.

The gas reactant containing sulphur trioxide can be obtained by evaporating commercial stabilized liquid sulphur trioxide or sulphur trioxide obtained by oleum distillation in a stream of inert gas, such as nitrogen, carbon dioxide or more usually dry air, or by elemental sulphur burning in a stream of dry air and conversion of sulphur dioxide to sulphur trioxide. In any case, a flow of gas or dry air can be by-passed ahead of the gas sulphur trioxide production system and used as equalizing gas.

The gas reactant containing sulphur trioxide is supplied to the reactor under a pressure of about 0.3-1.3 kg/cm$^2$ and at a convenient temperature in order not to result in condensation and obstruction of the distribution nozzles or solidification of the organic compound within the supply chamber. In the case of high melting point organic compounds, also the equalizing gas should be at a convenient temperature to avoid solidification at the inlet of the reaction tubes.

The reaction temperature will vary according to viscosity and melting point of the liquid phase and fully generally is in the range of about 30°-110°C. To this end, it should be noted that the temperature will vary along the reaction tubes: it increases instantaneously at the initial contact zone of the reactants because of the extremely fast reaction, whereupon the heat subtracted by external cooling will gradually prevail on the heat generated by the reaction and the temperature will drop.

The reaction tubes may be of such a length to effect a substantial cooling of the reaction mixture, or of a length just sufficient to provide a substantially complete absorption of sulphur trioxide; in the latter case the reaction product is further cooled at the reactor outlet, before or after the separation of the exhaust gas stream.

The method of the present invention is applicable to sulphonating and sulphating all of the organic compounds capable of reacting at a liquid state with gas sulphur trioxide. The compounds may be unitary, or mixtures of homologous terms or isomers, or both. Examples of these compounds are olefines having a linear or branched chain containing 8 to 20 carbon atoms with an inner or end double bond (alpha olefines); the aromatic hydrocarbons and aromatic hydrocarbons substituted by a linear or branched alkyl chain containing up to 25 carbon atoms, such as alkyl benzenes and particularly dodecylbenzene and tridecylbenzene; the fatty alcohols having a linear or branched chain containing 8 to 20 carbon atoms, such as lauryl alcohol and cetyl-stearyl alcohol; the condensation products of ethylene oxide with fatty alcohols and fatty acids having 8 to 20 carbon atoms and with alkyl phenols having an alkyl chain comprising 8 to 16 carbon atoms; the fatty acids containing 8 to 20 carbon atoms and their esters. Also mixtures of compounds having a different chemical structure can be used as starting materials, such as alkylbenzenes and fatty alcohols and also mixtures of compounds reacting with sulphur trioxide with other compounds not reacting therewith, such as fractions of mineral oils containing aromatic products.

Furthermore, the method of the present invention can be used also for other gas/liquid reactions occurring through heat development or absorption, provided that still an inert gas may be used as equalizing gas.

EXAMPLE 1

This example relates to the gas reactant distribution in a reactor as shown in FIG. 1, formed of commercial drawn pipes having a rated inner diameter of 11 mm. and a length of 1850 mm. The reactor is designed for a liquid reactant flow rate of 7.2 kg/h per tube (referred to dodecylbenzene) and a total air flow rate of 17 Nm$^3$/h. The annular inlet apertures for the liquid reactant and equalizing air having a thickness of 1.5 mm and a length of 20 mm. Under the above set forth conditions and under a pressure of 0.5 kg/cm$^2$ (in the equalizing air chamber), the inlet pressure drops for the equalizing superficial air are graphically shown in FIG. 5. The air velocity in the reaction tubes, referred to the tube cross-section, is about 50 m/sec. The average equalizing air flow rate is 2 Nm³/h per tube. The main air stream of 15 Nm³/h per tube is used for sulphur trioxide dilution. The equalization for changes in total air flow rate is contemplated, as due to changes in tube resistance, within a maximum of 6 percent, that is within 1 Nm³/h per tube. Thus, the equalizing air flows to the several tubes in amounts from 1.5 to 2.5 Nm³/h per tube. The inlet pressure drops for the equalizing air are of 40 and 70 mm water column, respectively. By using gas reactant distribution nozzles capable of providing a pressure drop of 0.20 kg/cm², the maximal difference in distribution is:

$$\left( \sqrt{\frac{2000}{2000 - (70 - 40)}} - 1 \right) \times 100 = 0.75\%$$

EXAMPLE 2

This example shows the sulphonation of commercial dodecyl benzene having a branched side chain and average molecular weight of 245. The characteristics of the reactor and the air flow rates are as shown in Example 1. A molar ratio of sulphur trioxide and organic reactant of 1.07 is used. The organic reactant is supplied to the reactor in a rate of 7.2 kg/h per tube and sulphur trioxide is evaporated in the main air stream in a rate of 2.52 kg/h per tube. The concentration of sulphur trioxide in the gas reactant is 4.5 percent by volume; as an average, it drops to 4 percent by volume when the gas reactant encounters the equalizing air and contacts the organic reactant. The temperature of the organic reactant is 20°C, whereas the temperature of the gas reactant is 45°C. Cooling water is circulated within the reactor at a temperature of 34°C. The pressure in the gas reactant supply chamber is 0.75 kg/cm², whereas the pressure in the equalizing air chamber is 0.55 kg/cm². The reaction mixture exits from the reactor at 60°C. After separation of the exhausted gas, dodecylbenzene sulphonic acid is rapidly cooled at 42°C, then kept in digestion for 20 minutes to complete the reaction and finally hydrated with 1 percent water to decompose the residual anhydrides. Dodecylbenzene sulphonic acid contains 1.6 percent unsulphonated material (determined by extracting with petroleum ether the product meutralized with sodium hydroxide) and 1.6 percent sulphuric acid. The product neutralized with sodium hydroxide in 5 percent aqueous solution of active material has a colour corresponding to 40 on Klett scale (40 mm. cell, No. 42 filter).

For a reactor according to the prior art, formed of tubes having approximately the same dimensions as those used in this example, a flow rate is shown of about 5 kg/h dodecyl benzole per tube, but with a concentration of sulphur trioxide in the gas reactant of about 8 percent by volume. According to experience, a reduction in sulphur trioxide concentration in the gas reactant to 4–5 percent by volume would enable to substantially improve the product colour; however, this involves a substantial reduction in dodecyl benzole flow rate in order to maintain the pressure drop within the reaction tubes in an acceptable value for an even distribution of the reactants.

EXAMPLE 3

This example relates to sulphation of a commercial fraction of linear synthetic fatty alcohols having an even number of carbon atoms, mainly $C_{12}$ and $C_{14}$. It is quite similar to commercial lauryl alcohol and has an average molecular weight of 198. The characteristics of the reactor and air flow rates are the same as in Example 1. A molar ratio of sulphur trioxide and organic compound of 1.00 is used. The organic reactant is supplied to the reactor in a rate of 6 kg/h per tube and sulphur trioxide is evaporated in the main air stream in a rate of 2.42 kg/h per tube. The concentration of sulphur trioxide in the gas reactant is 4.3 percent by volume; as an average, it drops to 3.8 percent by volume when the gas reactant encounters the equalizing air and contacts the organic reactant. The organic reactant has a solidification temperature of about 22°C and is supplied to the reactor at 29°C. The temperature of the gas reactant is 40°C. Cooling water at 29°C is circulated within the reactor. In the gas reactant supply chamber the pressure is 0.53 kg/cm², and in the equalizing air chamber the pressure is 0.30 kg/cm². The reaction mixture exits from the reactor at 37°C. After separation of the exhausted gas, the resultant (fatty alcohol sulfate) is rapidly cooled to 32°C and then neutralized with a 6 percent sodium hydroxide solution in a continuous mixer provided with cooling. During neutralization, the temperature is maintained at 36°C. The neutralized product contains 3.0 percent petroleum ether extract and 1.2 percent sodium sulphate on the basis 100 percent active material. The 5 percent aqueous solution of active material has a colour corresponding to 20 units on Klett scale.

For a reactor of the prior art, formed of tubes having approximately the same dimensions as those used in this example, the flow rate shown is about 2.3 kg/h of lauryl alcohol per tube, while sulphur trioxide concentration in the gas reactant is 4.5 percent by volume.

EXAMPLE 4

This example relates to sulphation of a commercial fraction of linear synthetic alcohols having an even number of carbon atoms, chiefly $C_{16}$, $C_{18}$ and $C_{20}$ and an average molecular weight of 263. The characteristics of the reactor and air flow rates are the same as shown in Example 1; a molar ratio of sulphur trioxide and organic reactant of 0.98 is used. The organic reactant is supplied to the reactor in a rate of 7.2 kg/h per tube and sulphur trioxide is evaporated in the main air stream in a rate of 2.14 kg/h per tube. Sulphur trioxide concentration in the gas reactant is 3.9 percent by volume and as an average it drops to 3.4 percent by volume when the gas reactant encounters the equalizing air and contacts the organic reactant. The solidification temperature of the organic reactant is 44.7°C, the latter being supplied to the reactor at 52°C. The gas reactant temperature is 46°C and the equalizing air is pre-heated at 50°C. Cooling water at 44°C is circulated within the reactor. In the gas reactant supply chamber the pressure is 0.6 kg/cm² and in the equalizing air chamber the pressure is 0.36 kg/cm². The reaction mixture exits from the reactor at 51°C. After separation of the exhausted gas, the resultant (fatty alcohol sulfate) is rapidly cooled to 45°C, then neutralized continuously with 5 percent sodium hydroxide solution, maintaining the temperature at 45°C. The neutralized product clearly dissolves in hot water. It contains 9.5 percent petroleum ether extract and 4.3 percent sodium sulphate on the basis 100 percent active material. The 5 percent aqueous solution of active material has a colour corresponding to 45 units on Klett scale.

EXAMPLE 5

The sulphation in Example 4 is repeated in a reactor formed of tubes having the dimensions as shown in Example 1, except using the distribution system for the reactants and equalizing air as shown in FIG. 4, wherein the ends of the gas reactant nozzle is recessed by 3 mm from the converging inlet of the reaction tube. Air and reactant flow rates and the other operating conditions are the same as in Example 4. The neutralized product has substantially the same analytical composition and the same characteristics of solubility and colour as the product of Example 4.

EXAMPLE 6

This example shows the influence of gas velocity in the reaction tubes on the colour of the product, relating to the sulphation of the fraction of fatty alcohols in Example 4. The characteristics of the reactor are those shown in Example 1. The total air flow is 10.3 Nm³/h per tube, 8.3 Nm³/h per tube of which entering as diluting air for sulphur trioxide and as an average 2 Nm³/h per tube as equalizing superficial air. The air velocity related to the tube cross-section is about 30/m/sec. The organic reactant flow rate is reduced relative to that in Example 4, in order to prevent a too high gas reactant concentration from affecting the colour of the product. The organic reactant is supplied to the reactor in a rate of 3.6 kg/h per tube and sulphur trioxide is evaporated in the main air stream in a rate of 1.07 kg/h per tube. Sulphur trioxide concentration in the gas reactant is 3.5 percent by volume and, as an average, it drops to 2.8 percent by volume when the gas reactant encounters the equalizing air and contacts the organic reactant. The temperature of the organic reactant, gas reactant and equalizing air are those as in Example 4. Cooling water at 46°C is circulated within the reactor in order to maintain the reaction mixture outlet at 51°C. After separation of the exhausted gas, the resultant (fatty alcohol sulfate) is cooled and neutralized as shown in Example 4. The colour of the product neutralized in 5 percent active material aqueous solution corresponds to 75 units on Klett scale. As in test 4, the air flow rate for diluting sulphur trioxide is then increased to 15 Nm³/h, the other conditions being left unaltered. The colour of the novel product neutralized in 5 percent active material aqueous solution corresponds to 37 units on the Klett scale. It is still more significant that the increase in air flow rate causes for some instants the outlet of very dark sulphation product from the reactor. The liquid reactant which, at a low gas velocity, tends to stay for too a long time within the reaction tubes and darken is "blown out," while the new flow regime corresponding to the increased gas flow rate is set up.

What is claimed is:

1. An improved process for continuously sulfonating and sulfating a liquid organic compound selected from the group consisting of olefins, aromatic hydrocarbons, alkyl aromatic hydrocarbons, fatty alcohols, fatty acids, fatty acid esters, ethoxylated fatty alcohols, and ethoxylated alkyl phenols, wherein the liquid reactant consisting of said sulfonatable and sulfatable organic compound and a gaseous reactant consisting of a mixture of sulfur trioxide and inert gas are fed, each from a single space, through distribution means, to a plurality of externally cooled parallel reaction tubes with downward annular two-phase flow to effect sulfonation and sulfation of said compound, which process comprises: introducing said liquid reactant circumferentially into said tubes, introducing said gaseous reactant centrally into said tubes immediately beyond the introducing openings for said liquid reactant, introducing to said tubes further inert gas from a further separated single space through said introducing openings and in contact with said liquid reactant, the flow rate of said further inert gas being in the range of 8–19 percent of the overall inert gas flow rate in each tube, the pressure drops of said further inert gas at the entrance of said tubes being in the range of 0.5–8 percent of the pressure drop in the distribution means of said gaseous reactant, so that said further inert gas actually distributes to said tubes producing an overall gas flow rate in each tube which is a decreasing function of the resistance therein to the gas flow, thereby substantially to equalize the pressure downstream of all the distribution means for the liquid and gaseous reactants in order to provide for uniform distribution of the reactants to said reaction tubes without limiting the pressure drop therein, which is utilized as an energy factor for increasing liquid reactant flow rate, promoting heat removal and interphase mass transfer and reducing liquid phase residence time.

2. A process according to claim 1, wherein the temperature in said reaction tubes is in the range of about 30°–110°C.

3. A process according to claim 1, wherein the pressure drop in said distribution means for the gaseous reactant is in the range of 0.10–0.35 kg/cm² and the pressure drops of said further inert gas for equalizing the pressures, at the entrance of said reaction tubes, is in the range of 20–120 mm. column of water.

4. A process according to claim 1, wherein the molar ratio of SO₃ to the organic compound is in the range of 0.9–1.2.

5. A process according to claim 1, wherein the concentration of sulfur trioxide in the gaseous reactant is in the range of 2–12 volume percent.

6. A method according to claim 1, wherein the further inert gas for equalizing the pressures flows to the reaction tubes concentrically between the liquid reactant supplied to the inner surfaces of the tubes and the gas reactant injected in the central zone of each tube.

7. A method according to claim 1, wherein said reaction tubes have an inner diameter in the range of 8–18 mm and a length in the range of 0.8–5.0 meters.

* * * * *

UNITED STATES PATENT AND TRADEMARK OFFICE
CERTIFICATE OF CORRECTION

PATENT NO. : 3,931,273
DATED : January 6, 1976
INVENTOR(S) : Agostino LANTERI

It is certified that error appears in the above-identified patent and that said Letters Patent are hereby corrected as shown below:

Heading [54] title, change to --SULPHONATING AND SULPHATING--.
    Column 1, title, change to --SULPHONATING AND SULPHATING--.
    Column 1, line 32, change "trioxide" to --dioxide--.
    Column 2, line 51, after "or" insert --in--;
            line 59, change "the long run" to --long service--; and
            line 61, change "two liquid/gas phase flows" to --a two-phase gas-liquid flow--.
    Column 3, line 52, after "all" cancel "of".
    Column 8, line 53, change "through" to --with--.
    Column 9, lines 59 and 65, change "benzole" to --benzene--.
    Column 10, lines 25, 26, 64 and 65, and column 11, lines 44 and 45, cancel the parentheses.
    Column 12, line 1, change "sulfonating" to --sulphonating--;
            line 2, change "sulfating" to --sulphating--;
            line 7, change "sulfonatable" to --sulphonatable-- and change "sulfatable" to --sulphatable--;
            line 9, change "sulfur" to --sulphur--;
            line 12, change "sulfonation" to --sulphonation--;
            line 13, change "sulfation" to --sulphation--;
            line 51, change "sulfur" to --sulphur--.

Signed and Sealed this

Thirtieth Day of November 1976

[SEAL]

Attest:

RUTH C. MASON
*Attesting Officer*

C. MARSHALL DANN
*Commissioner of Patents and Trademarks*